(12) United States Patent
Sato et al.

(10) Patent No.: US 11,494,638 B2
(45) Date of Patent: Nov. 8, 2022

(54) LEARNING SUPPORT DEVICE AND LEARNING SUPPORT METHOD

(71) Applicant: HITACHI, LTD., Tokyo (JP)

(72) Inventors: Naoto Sato, Tokyo (JP); Hironobu Kuruma, Tokyo (JP); Yuichiroh Nakagawa, Tokyo (JP); Hideto Noguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 847 days.

(21) Appl. No.: 16/412,559

(22) Filed: May 15, 2019

(65) Prior Publication Data

US 2019/0362228 A1 Nov. 28, 2019

(30) Foreign Application Priority Data

May 22, 2018 (JP) .............................. JP2018-097591

(51) Int. Cl.
*G06N 3/08* (2006.01)
*G06F 17/16* (2006.01)

(52) U.S. Cl.
CPC .............. *G06N 3/08* (2013.01); *G06F 17/16* (2013.01)

(58) Field of Classification Search
None
See application file for complete search history.

(56) References Cited

U.S. PATENT DOCUMENTS

| 2017/0185897 A1* | 6/2017 | Droppo ............... G06F 11/0721 |
| 2018/0174042 A1* | 6/2018 | Srinivasa ................ G06N 3/08 |
| 2019/0130110 A1* | 5/2019 | Lee .......................... G06F 21/57 |
| 2019/0188562 A1* | 6/2019 | Edwards ................. G06N 3/04 |

OTHER PUBLICATIONS

Fan, Yang, Fei Tian, Tao Qin, Xiang-Yang Li, and Tie-Yan Liu. "Learning to teach." arXiv preprint arXiv:1805.03643 (2018). (Year: 2018).*
The Missing Piece in Complex Analytics: Low Latency, Scalable Model Management and Serving with Velox, UC Berkeley, 2014.

* cited by examiner

*Primary Examiner* — Frank D Mills
(74) *Attorney, Agent, or Firm* — Mattingly & Malur, PC (57) ABSTRACT

A learning support device stores, as execution information, a set of an input value, an execution output value as an execution result and an expected output value, for a machine learning program. An arithmetic device generates an output value different from the expected output value as a teacher output value in accordance with a predetermined rule when the execution output value and the expected output value for a predetermined input value match each other, generates a loss function based on a difference between the teacher output value and the execution output value, generates a change value indicating a change in the loss function for each parameter in the neural network, calculates an influence degree of predetermined learning by calculating influence of an update value of the parameter obtained by the learning on the change value, and determines whether or not the update value is adopted based on the influence degree.

7 Claims, 9 Drawing Sheets

EXAMPLE OF OUTPUT VALUE

[0.04, <u>0.31</u>, 0.05, 0.09, 0.01, 0.07, 0.02, <u>0.36</u>, 0.04, 0.01]  ~1131

ACCURACY OF IMAGE THAT IS 1    ACCURACY OF IMAGE THAT IS 7

FIG. 4

EXAMPLE OF OUTPUT VALUE

[0.04, <u>0.36</u>, 0.05, 0.09, 0.01, 0.07, 0.02, <u>0.31</u>, 0.04, 0.01]  ~1131

ACCURACY OF IMAGE THAT IS 1    ACCURACY OF IMAGE THAT IS 7

FIG. 5

EXAMPLE OF EXPECTED OUTPUT VALUE

EXAMPLE OF LOSS FUNCTION CALCULATION EXPRESSION

OUTPUT VALUE $[y_1, y_2, y_3, y_4, y_5, y_6, y_7, y_8, y_9, y_{10}]$
= [0.04, 0.31, 0.05, 0.09, 0.01, 0.07, 0.02, 0.36, 0.04, 0.01]

CORRECT ANSWER TEACHER OUTPUT VALUE $[t_1, t_2, t_3, t_4, t_5, t_6, t_7, t_8, t_9, t_{10}]$
= [0.00, 1.00, 0.00, 0.00, 0.00, 0.00, 0.00, 0.00, 0.00, 0.00]

LOSS FUNCTION $L_k = \dfrac{1}{2} \sum_i (y_i - t_i)^2$

FIG. 8

EXAMPLE OF GRADIENT VECTOR CALCULATION EXPRESSION

ARRAY OF VARIABLES REPRESENTING WEIGHT AND BIAS IS $[W_1, W_2, ..., W_s]$

GRADIENT VECTOR $\nabla L_k = [\dfrac{\partial L_k}{\partial w_1}, \dfrac{\partial L_k}{\partial w_2}, ..., \dfrac{\partial L_k}{\partial w_s}]$ ~ 1191

FIG. 9

EXAMPLE 1 OF INVERSE LOSS FUNCTION CALCULATION EXPRESSION

OUTPUT VALUE $y_k$ FOR INPUT VALUE $x_k$ $y_k = [y_1, y_2, y_3, y_4, y_5, y_6, y_7, y_8, y_9, y_{10}]$
= [0.04, 0.36, 0.05, 0.09, 0.01, 0.07, 0.02, 0.31, 0.04, 0.01]

INCORRECT ANSWER TEACHER OUTPUT VALUE $t_k = [t_1, t_2, t_3, t_4, t_5, t_6, t_7, t_8, t_9, t_{10}]$
= [0.00, 0.00, 0.00, 0.00, 0.00, 0.00, 0.00, 1.00, 0.00, 0.00]

INVERSE LOSS FUNCTION $M_k = \dfrac{1}{2} \sum_i (y_i - t_i)^2$

FIG. 10

EXAMPLE 2 OF INVERSE LOSS FUNCTION CALCULATION EXPRESSION

OUTPUT VALUE $y_k$ FOR INPUT VALUE $x_k$ $y_k = [y_1, y_2, y_3, y_4, y_5, y_6, y_7, y_8, y_9, y_{10}]$

= [0.04, 0.36, 0.05, 0.09, 0.01, 0.07, 0.02, 0.31, 0.04, 0.01]

INCORRECT ANSWER TEACHER OUTPUT VALUE $t_k = [t_1, t_2, t_3, t_4, t_5, t_6, t_7, t_8, t_9, t_{10}]$

= [0.00, 0.335, 0.00, 0.00, 0.00, 0.00, 0.00, 0.335, 0.00, 0.00]

INVERSE LOSS FUNCTION $\quad M_k = \frac{1}{2} \sum_i (y_i - t_i)^2$

FIG. 11

EXAMPLE OF INVERSE GRADIENT VECTOR CALCULATION EXPRESSION

ARRAY OF VARIABLES REPRESENTING WEIGHT AND BIAS IS $[W_1, W_2, ..., W_s]$

INVERSE GRADIENT VECTOR $\quad \nabla M_k = [\frac{\partial M_k}{\partial w_1}, \frac{\partial M_k}{\partial w_2}, ..., \frac{\partial M_k}{\partial w_s}]$    1201

FIG. 13

EXAMPLE 1 OF BAD INFLUENCE DEGREE CALCULATION
EXPRESSION FOR INPUT VALUE CORRECTLY ANSWERED

VECTOR REPRESENTING WEIGHT AND BIAS UPDATE VALUE IS
$-\eta \nabla P$ ⟶ 1231

BAD INFLUENCE DEGREE
$$BA = \left( \sum_k -\eta \nabla P \cdot -\nabla M_k \right)$$

FIG. 14

EXAMPLE 2 OF BAD INFLUENCE DEGREE CALCULATION
EXPRESSION FOR INPUT VALUE CORRECTLY ANSWERED

VECTOR REPRESENTING WEIGHT AND BIAS UPDATE VALUE IS
$-\eta \nabla P$ ⟶ 1231

PRIORITY SET FOR INPUT VALUE $x_k$ is $p_k$

BAD INFLUENCE DEGREE
$$BA = \left( \sum_k -\eta \nabla P \cdot -p_k \nabla M_k \right)$$

FIG. 15

EXAMPLE 3 OF BAD INFLUENCE DEGREE CALCULATION
EXPRESSION FOR INPUT VALUE CORRECTLY ANSWERED

BAD INFLUENCE DEGREE
$$BA = \left( \sum_k (-\eta \nabla P \cdot -\nabla M_k)^2 \right)$$

FIG. 16

EXAMPLE 4 OF BAD INFLUENCE DEGREE CALCULATION
EXPRESSION FOR INPUT VALUE CORRECTLY ANSWERED

BAD INFLUENCE DEGREE
$$BA = k \left( \sum_k (-\eta \nabla P \cdot -\nabla M_k)^2 \right)$$

FIG. 17

EXAMPLE OF GOOD INFLUENCE DEGREE CALCULATION
EXPRESSION FOR INPUT VALUE INCORRECTLY ANSWERED $$GA = \left( \sum_k -\eta \nabla P \cdot -\nabla L_k \right)$$

※ VARIATIONS SIMILAR TO EXAMPLES 2 TO 4 OF BAD INFLUENCE
DEGREE CALCULATION EXPRESSION CAN BE CREATED FOR
GOOD INFLUENCE DEGREE CALCULATION EXPRESSION

FIG. 18

EXAMPLE OF OVERALL INFLUENCE DEGREE CALCULATION EXPRESSION $$A = \left( \sum_k -\eta \nabla P \cdot -\nabla M_k \right) - \left( \sum_k -\eta \nabla P \cdot -\nabla L_k \right)$$

FIG. 19

EXAMPLE OF INFLUENCE VALUE FOR EACH INPUT VALUE    1221

| INPUT VALUE IDENTIFIER | TYPE | INFLUENCE DEGREE |
|---|---|---|
| 1 | GOOD INFLUENCE | 0.563 |
| 2 | BAD INFLUENCE | 0.0342 |
| 3 | BAD INFLUENCE | 0.291 |
| ... | ... | ... |

LEARNING SUPPORT DEVICE AND LEARNING SUPPORT METHOD

CROSS-REFERENCE TO RELATED APPLICATIONS

The present application claims priority pursuant to 35 U.S.C. § 119 from Japanese Patent Application No. 2018-097591, filed on May 22, 2018, the entire disclosure of which is incorporated herein by reference.

BACKGROUND

The present invention relates to a learning support device and a learning support method, and more specifically, to a technique that reduces a probability of being changed for the worse of a model generated by machine learning and realizes rapid model update at a time of updating the model.

In recent years, attention has been paid to the effectiveness of a program (referred to as a model) developed by machine learning such as Deep Neural Network (DNN) for a problem in which sufficient accuracy cannot be expected in a related IF-THEN format program such as predictive analysis.

In such machine learning, a model is generated based on data collected for learning. Therefore, behavior of the generated model depends on the data used for generation of the model.

Meanwhile, such data is merely what captures a predetermined phenomenon at a certain time in the past. In other words, when the phenomenon changes over time, there is a probability that distribution or tendency of the data also greatly changes depending on collection time. As a result, in the model based on the data, there is a high probability that the accuracy decreases as time passes, that is, as the input data changes.

For example, fluctuation of stock price, or the like is greatly affected by society. Therefore, even if a stock trade model is developed based on past data in different social environments, it is considered that the stock trade model has low effectiveness for current stock trade.

As a related-art technique with degradation of such a model, for example, there has been proposed a system or the like (see The Missing Piece in Complex Analytics: Low Latency, Scalable Model Management and Serving with Velox, UC Berkeley, 2014) that has an additional learning function for data collection and model update, and that updates a model at a time of operation using the collected data.

However, if data or a hyper parameter used for the additional learning described above is inappropriate, the model may be changed for the worse by update. Moreover, since such additional learning is executed at the time of operation, the model being changed for the worse is directly linked to an increase in error rate of the system.

SUMMARY

In view of this, an objective of the invention is to provide a technique that reduces a probability of a model generated by machine learning being changed for the worse and realizes rapid model update at a time of updating the model.

A learning support device according to the invention which solves the above problems includes: 1) a storage device that stores, as execution information, a set of an input value, an execution output value as an execution result thereof and an expected output value that is an output value expected for the input value, for a machine learning program that is executed according to an algorithm of a neural network; and 2) an arithmetic device that generates an output value different from the expected output value as a teacher output value in accordance with a predetermined rule when the execution output value and the expected output value for a predetermined input value match with each other, generates a loss function based on a difference between the teacher output value and the execution output value, generates a change value indicating a change in the loss function for each parameter in the neural network, calculates an influence degree of predetermined learning by calculating influence of an update value of the parameter obtained by the learning on the change value, and determines whether or not the update value is adopted based on the influence degree.

Further, in a learning support method according to the invention, an information processing device includes a storage device which stores, as execution information, a set of an input value, an execution output value as an execution result thereof and an expected output value that is an output value expected for the input value, for a machine learning program that is executed according to an algorithm of a neural network. The information processing device generates an output value different from the expected output value as a teacher output value in accordance with a predetermined rule when the execution output value and the expected output value for a predetermined input value match with each other, generates a loss function based on a difference between the teacher output value and the execution output value, generates a change value indicating a change in the loss function for each parameter in the neural network, calculates an influence degree of predetermined learning by calculating influence of an update value of the parameter obtained by the learning on the change value, and determines whether or not the update value is adopted based on the influence degree.

According to the invention, a probability of a model generated by machine learning being changed for the worse can be reduced and rapid model update can be realized at a time of updating the model.

DETAILED DESCRIPTION OF THE EMBODIMENTS

Functional Configuration of Learning Support Device

Figure 1:
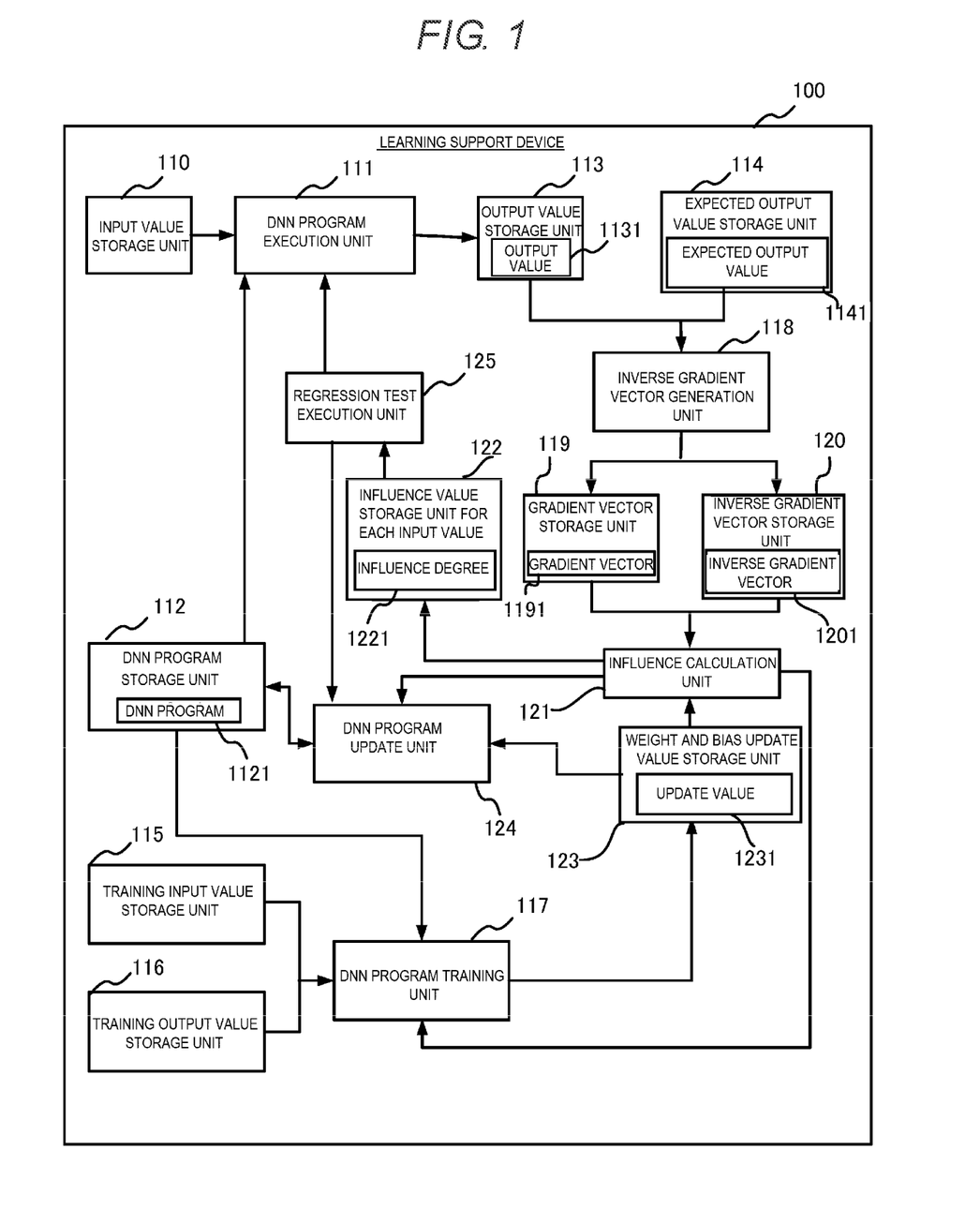
FIG. 1 illustrates an exemplary configuration of a learning support device according to an embodiment.

Hereinafter, embodiments of the invention will be described in detail with reference to the drawings. FIG. 1 illustrates an exemplary configuration of a learning support device 100 according to an embodiment. The learning support device 100 illustrated in FIG. 1 is a computer device that can reduce a probability of a model generated by machine learning being changed for the worse and realizes rapid model update at a time of updating the model. In the embodiment, the model is described as a DNN program serving as a machine learning program.

Generally, in DNN learning, when an execution result of a DNN program is an incorrect answer, a difference of the incorrect answer from a correct answer (teacher data) is indicated by a loss function, and the DNN program is changed such that a value of the loss function decreases. Meanwhile, in the learning support device 100 according to the embodiment, when the execution result of the DNN program is a correct answer, a difference of the correct answer from a close incorrect answer is treated as an inverse loss function. When an update value of the DNN program is determined by predetermined learning, a degree to which the DNN program is changed for the worse is calculated as an influence degree of how much the update value reduces the inverse loss function, that is, how close the update value approaches the incorrect answer from the correct answer. The learning support device 100 selects an update value that is least likely to change the DNN program for the worse by performing multiple learning with the influence degree as an indicator.

As illustrated in FIG. 1, the learning support device 100 includes an input value storage unit 110, a DNN program execution unit 111, a DNN program storage unit 112, an output value storage unit 113, an expected output value storage unit 114, a training input value storage unit 115, a training output value storage unit 116, a DNN program training unit 117, an inverse gradient vector generation unit 118, a gradient vector storage unit 119, an inverse gradient vector storage unit 120, an influence calculation unit 121, an influence value storage unit 122 for each input value, a weight and bias update value storage unit 123, a DNN program update unit 124 and a regression test execution unit 125.

These are functional units that are implemented to collaborate a program and hardware in the learning support device 100.

Among the functional units, the input value storage unit 110 stores an input value that is to be input to a DNN program 1121. This input value includes, for example, a test input value generated for a certain expected output value, but is not particularly limited thereto. An image recognition program is assumed hereinafter as an example of the DNN program 1121.

Figure 5:
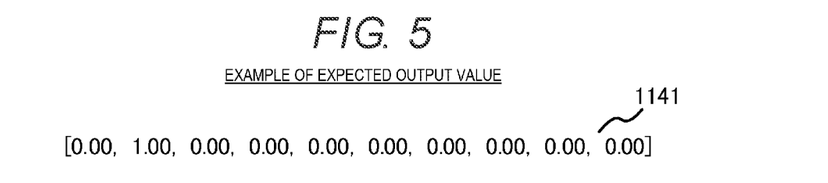
FIG. 5 shows an example of an expected output value in the embodiment.

The input value assumed as an example in the embodiment is image data displaying a number. A number recognized when the input value is given to the image recognition program serving as the DNN program 1121 is an expected output value if the number is expected (FIG. 5).

Further, the DNN program execution unit 111 inputs the input value to the DNN program 1121 (read from the DNN program storage unit 112 to be described below), and acquires an output value (execution output value) thereof.

The DNN program storage unit 112 stores the DNN program 1121. The DNN program 1121 is a program generated by a neural network. In the embodiment, an image recognition program is assumed as an example of the DNN program 1121.

Figure 3:
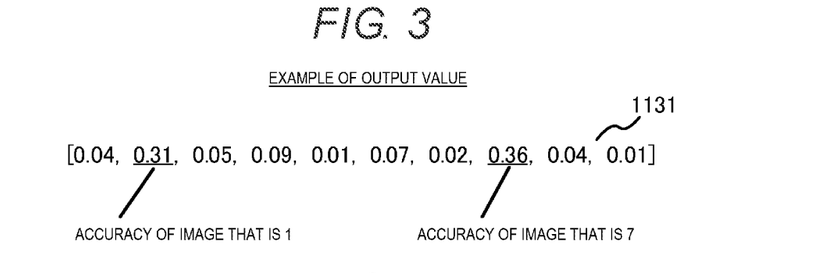
FIG. 3 shows an example 1 of an output value in the embodiment.
Figure 4:
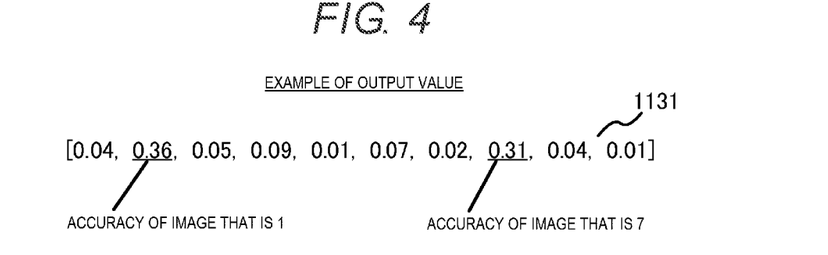
FIG. 4 shows an example 2 of the output value in the embodiment.

The output value storage unit 113 stores an output value 1131 that is an execution output value obtained by execution by the DNN program execution unit 111. Details of the output value 1131 will be described below (FIGS. 3 and 4).

The expected output value storage unit 114 stores an expected output value 1141. Details of the expected output value 1141 will be described below (FIG. 5).

The set of the input value stored by the input value storage unit 110, the output value 1131 stored by the output value storage unit 113 and the expected output value 1141 stored by the expected output value storage unit 114 corresponds to execution information in the invention.

The training input value storage unit 115 stores a training input value with respect to the DNN program training unit 117. The training output value storage unit 116 stores a training output value to be output with respect to the training input value in the DNN program training unit 117.

The training input value is equivalent to, for example, a so-called new input value obtained from creation or the most recent update of the DNN program 1121 (including the concept of generation). The training output value is an output value serving as teacher data corresponding to the training input value.

Meanwhile, when learning of the DNN program 1121 is input as the training input value, the DNN program training unit 117 adjusts a parameter in the DNN program 1121 so as to output a training output value for the training input value. The DNN program training unit 117 gives parameters (for example, a learning coefficient and a gradient vector being a variation, to be described below) obtained through the training to the weight and bias update value storage unit 123 (described below) as an update value 1231.

The inverse gradient vector generation unit 118 generates an inverse loss function and a loss function, generates change values indicating respective change in the inverse loss function and the loss function for each parameter in the DNN program 1121, stores the change value obtained for the inverse loss function as an inverse gradient vector 1201 in the inverse gradient vector storage unit 120, and stores the change value obtained for the loss function as a gradient vector 1191 in the gradient vector storage unit 119.

In this case, when the output value 1131 for the predetermined input value in the input value storage unit 110 matches with the expected output value 1141 in generation of the inverse loss function, the inverse gradient vector generation unit 118 generates an output value different from the expected output value 1141 as an incorrect answer teacher output value according to a predetermined rule, and generates an inverse loss function based on a difference between the incorrect answer teacher output value and the output value 1131.

When the output value 1131 for the predetermined input value in the input value storage unit 110 does not match with the expected output value 1141 in generation of the loss function, the inverse gradient vector generation unit 118 generates the expected output value 1141 as a correct answer teacher output value, and generates a loss function based on a difference between the correct answer teacher output value and the output value 1131.

In generation of the inverse gradient vector 1201 and the gradient vector 1191 that are the change values, the method is not limited with the inverse gradient vector generation unit 118. For example, the inverse gradient vector generation unit 118 can generate the inverse gradient vector 1201 and the gradient vector 1191 as one form of the change values by performing partial differentiation on the inverse loss function and loss function respectively.

The influence calculation unit 121 calculates an influence degree of learning (adjustment of parameters based on the training input value and the training output value in the DNN program training unit 117) that is the origin of the update value 1231, by calculating the influence of the update value 1231 stored by the weight and bias update value storage unit 123 on the inverse gradient vector 1201 and the gradient vector 1191 that are the change values, and determines whether to adopt the update (parameter update by the update value 1231) based on whether the influence degree is equal to or less than a predetermined threshold, that is, whether an element of the bad influence is equal to or less than predetermined reference.

The influence calculation unit 121 can take a value as the influence degree when calculating the influence degree. The value is obtained by subtracting a calculated value (good influence value) of an inner product between the vector of the update value 1231 of the parameter and the gradient vector 1191 (change value vector of the loss function of the parameter) from a calculated value (bad influence value) of the inner product between the vector of the update value 1231 of the parameter and the inverse gradient vector 1201 (change value vector of the inverse loss function of the parameter). The influence degree obtained in this way is stored in the influence value storage unit 122 for each input value.

As a variation of the influence degree calculation by the influence calculation unit 121, a mode can also be assumed in which a predetermined weight value is multiplied by an inner product relating to an update value of a corresponding parameter according to importance of execution information so as to calculate the influence degree.

Alternatively, a mode can be assumed in which exponentiation operations are performed on the calculated value (bad influence value) of the inner product between the vector of the update value and the inverse gradient vector 1201, and on the calculated value (good influence value) of the inner product between the vector of the update value of the parameter and the gradient vector 1191, and then the subtraction is performed to calculate the influence degree.

Further, a mode can be assumed in which a value, which is obtained by multiplying the calculated value (good influence value) of the inner product between the vector of the update value of the parameter and the gradient vector 1191 by the number of pieces of execution information to be generated by the loss function, is subtracted from a value, which is obtained by multiplying the calculated value (bad influence value) of the inner product between the vector of the update value of the parameter and the inverse gradient vector 1201 by the number of pieces of execution information to be generated by the inverse loss function, to calculate the influence degree.

It is preferable that the influence calculation unit 121 lowers the threshold used for the determination of the adoption by a predetermined degree in accordance with a predetermined rule, after the update (by the DNN program update unit 124) of the DNN program 1121 by the update value determined to be adopted by the determination of the adoption as described above.

When the result of the update adoption determination by the influence calculation unit 121 is update permission, the DNN program update unit 124 obtains the update value 1231 from the weight and bias update value storage unit 123, thereby updating the DNN program 1121 in the DNN program storage unit 112.

The regression test execution unit 125 also determines the adoption of the update value by the influence calculation unit 121, updates the DNN program 1121 by the update value, and then executes a regression test for the DNN program 1121.

In this case, the regression test execution unit 125 sequentially selects input values with a large influence degree, that is, input values with the bad influence value being relatively larger than the good influence value, as input values of the DNN program 1121 to be subjected to a regression test, to execute the regression test. The number of cases is counted where the test result indicates that the output value and the expected output value for the input value do not match with each other, that is, an incorrect answer is presented, so that the update is rolled back when the counted value exceeds the predetermined reference.

Hardware Configuration

Figure 2:
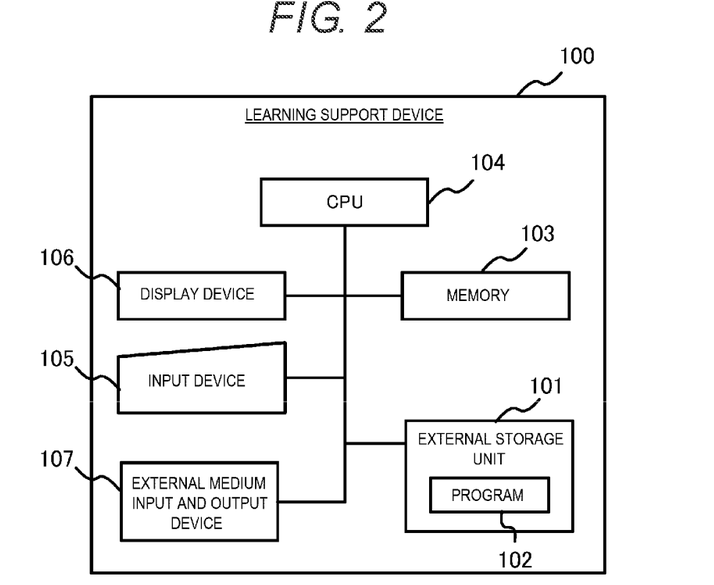
FIG. 2 illustrates an exemplary hardware configuration of the learning support device in the embodiment.

The hardware configuration of the learning support device 100 according to the embodiment is as follows. FIG. 2 illustrates an exemplary hardware configuration of the learning support device 100 according to the embodiment.

The learning support device 100 according to the embodiment includes an external storage device 101, a memory 103, a CPU 104 (arithmetic device), an input device 105, an output device 106, and an external medium input and output device 107.

The external storage device 101 is, for example, a storage unit configured by an appropriate nonvolatile storage element such as a Solid State Drive (SSD) or a hard disk drive.

The memory 103 is a storage unit configured by a volatile storage element such as a RAM.

The CPU 104 is an arithmetic unit that executes a program 102 stored in the external storage device 101 by reading the program 102 into the memory 103 or the like, that performs overall control of the device itself, and that performs various determinations, calculations, and control processes.

The input device 105 is an input device that receives key input and voice input from an appropriate user, such as a person in charge of update and management of the DNN program 1121.

The output device 106 is a display device such as a display that displays processing data.

The external medium input and output device 107 includes an interface connectable to various types of storage media such as a portable memory and a magnetic storage medium, and exchanges data with the storage medium. The information read from the storage medium by the external medium input and output device 107 is, for example, a DNN program 1121, an input value, an output value, an expected output value, a gradient vector 1191, an inverse gradient vector 1201, an influence degree 1221, and the update value 1231.

The DNN program 1121, the input value, the output value, the expected output value, the gradient vector 1191, the inverse gradient vector 1201, the influence degree 1221 and the update value 1231 are at least stored in the external storage device 101, in addition to the program 102 that implements the functions necessary for the learning support device 100 according to the embodiment. Details of the information thereof will be described below.

Examples of Data Structure

Next, various types of information used by the learning support device 100 according to the embodiment will be described. FIGS. 3 and 4 respectively show examples of the output values in the embodiment.

The output value 1131 in the embodiment is an execution output value by the DNN program 1121 provided by inputting a predetermined input value (hereinafter referred to as an input vector). Here, the input vector is, for example, image data in which a certain number (for example: 1) is drawn. Therefore, the output value 1131 exemplified in FIGS. 3 and 4 indicates an input vector that includes the accuracy of each number in a case where "1" of the number drawn in the image data is taken as an expected output value.

That is, the shown output value 1131 includes a value of each element output by the DNN program 1121 for the input vector. The "element" here is drawn by the image data that is an input vector, and corresponds to one of the numbers "0" to "9" as the image recognition result. Therefore, the output value 1131 includes values of accuracy determined by the DNN program 1121 for each of the element numbers "0" to "9".

FIG. 5 shows an example of the expected output value 1141. The example of the expected output value 1141 includes values of accuracy that are output value expected as correct answers for each of the elements numbers "0" to "9". As described above, when number "1" is the expected output value, the accuracy for the number "1" is "1.00", while the accuracy for all other numbers is "0.00".

Flow Example 1

The actual procedure of the learning support method in the embodiment will be described below with reference to the drawings. Various operations corresponding to the learning support method to be described below are realized by the program 102 which is read into a memory or the like and executed by the learning support device 100. The program 102 includes codes for performing the various operations described below.

Figure 6:
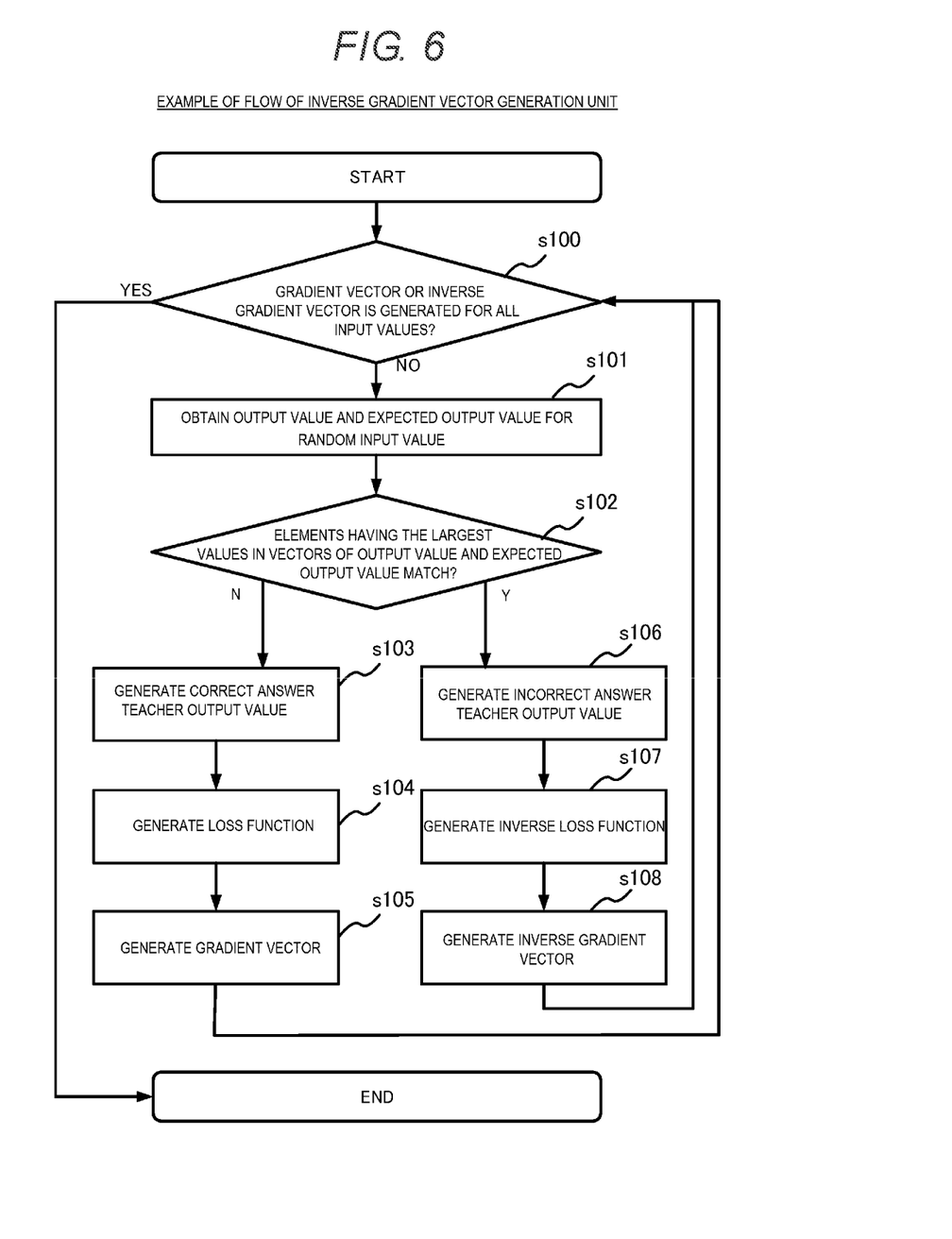
FIG. 6 shows an example 1 of a flow of a learning support method according to the embodiment.

FIG. 6 shows an example 1 of a flow of the learning support method in the embodiment. Before the start of this flow, when the learning of the DNN program 1121 is input as a training input value (obtained from the training input value storage unit 115), the DNN program training unit 117 adjusts a parameter in the DNN program 1121 so as to output a training output value (obtained from the training output value storage unit 116) for the training input value, takes parameters (the learning coefficient η and the gradient vector ΔP) obtained through the training as update values 1231, and stores the update values 1231 in the weight and bias update value storage unit 123. The learning coefficient η is a constant value.

In this case, the inverse gradient vector generation unit 118 of the learning support device 100 refers to the input value storage unit 110, the gradient vector storage unit 119 and the inverse gradient vector storage unit 120, and determines whether the gradient vector 1191 and the inverse gradient vector 1201 have been generated for all input values (s100).

When the result of the determination indicates that the gradient vector 1191 and the inverse gradient vector 1201 have already been generated for all the input values (s100: Y), the inverse gradient vector generation unit 118 ends the flow.

On the other hand, when the result of the determination indicates that the gradient vector 1191 and the inverse gradient vector 1201 have not been generated for all the input values (s100: N), the inverse gradient vector generation unit 118 obtains the output value and the expected output value from the output value storage unit 113 and the expected output value storage unit 114 for a user-designated or random input value (neither of which has created the gradient vector 1191 or the inverse gradient vector 1201) (s101).

The inverse gradient vector generation unit 118 assigns a processed flag to the input value in the input value storage unit 110 each time the process of the flow is executed for the input value. Therefore, the inverse gradient vector generation unit 118 performs the determination in s100 and the acquisition of the unprocessed output value 1131 and the expected output value 1141 in s101 based on the presence or absence of the flag.

Next, the inverse gradient vector generation unit 118 determines whether or not the elements having the largest values among the elements of the output value 1131 and the expected output value 1141 obtained in s101 match (s102).

When the result of the determination indicates that the elements having the largest values of the output value 1131 and the expected output value 1141 do not match, that is, an incorrect answer is presented (s102: N), the inverse gradient vector generation unit 118 generates a correct answer teacher output value (s103), and generates a loss function based thereon (s104).

Figure 7:
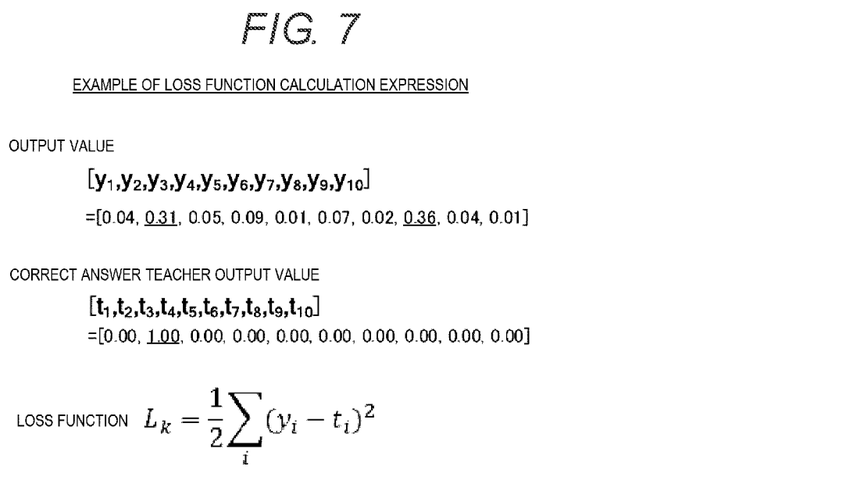
FIG. 7 shows a conceptual calculation example of a loss function in the embodiment.
Figure 8:
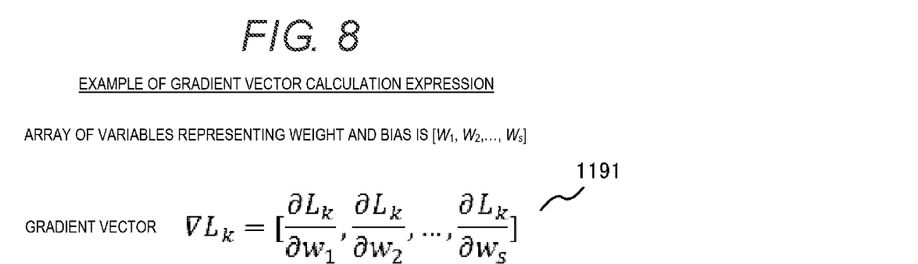
FIG. 8 shows a conceptual calculation example of a gradient vector in the embodiment.

FIG. 7 shows an example of a correct answer teacher output value generated for a certain output value and an example of a loss function based thereon. As shown in FIG. 7, the accuracy of the number "7" is the maximum as the output value 1131. However, it is assumed that the accuracy of the number "1" among the elements should be the maximum as the corresponding expected output value 1141. That is, the output value 1131 is an incorrect answer. In this case, the inverse gradient vector generation unit 118 generates a correct answer teacher output value in which accuracy of the number "1" is "1.00", as indicated by the expected output value 1141. As the loss function, the square value of the value obtained by subtracting the correct answer teacher output value "$t_i$" from the output value "$y_i$" is summed up for each element, and the function taking a half value thereof is taken as the loss function. Such a method of generating the loss function is merely an example, and an existing loss function generation method may be adopted as appropriate.

Subsequently, the inverse gradient vector generation unit 118 performs partial differentiation of the loss function obtained in s104, generates the gradient vector 1191 (s105), stores the gradient vector 1191 in association with an input value ("random input value" in s101) in the gradient vector storage unit 119, and returns the process to s100. Such a method of generating the gradient vector 1191 is not limited, and other methods may be adopted as appropriate.

On the other hand, when the result of the determination in s102 indicates that the elements having the largest values of the output value 1131 or the expected output value 1141 match, that is, a correct answer is presented (s102: Y), the inverse gradient vector generation unit 118 generates an incorrect answer teacher output value (s106), and generates an inverse loss function based thereon (s107).

In this case, in generating the inverse loss function, the inverse gradient vector generation unit 118 generates an output value different from the expected output value 1141 as an incorrect answer teacher output value in accordance with the predetermined rule, and generates an inverse loss function based on the difference between the incorrect answer teacher output value and the output value 1131.

Figure 9:
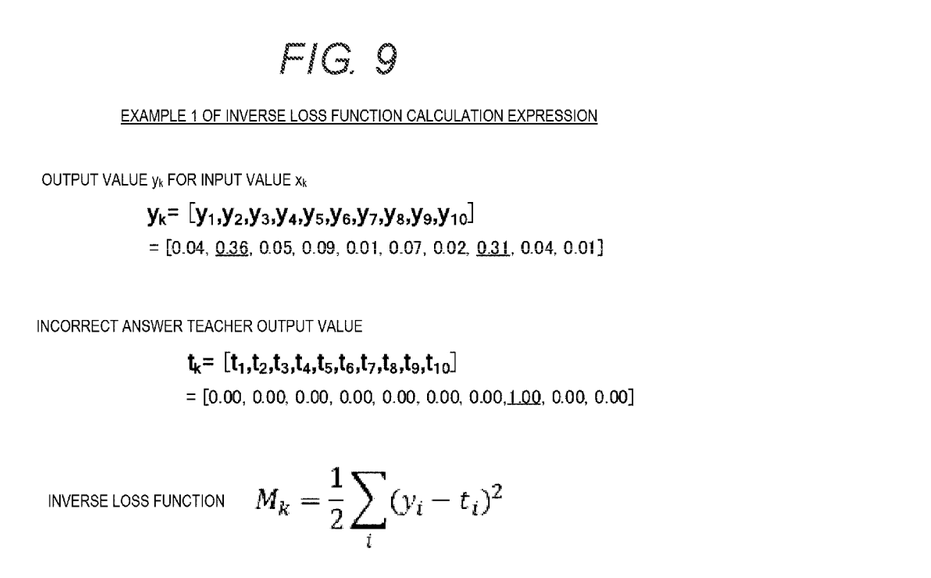
FIG. 9 shows a conceptual calculation example 1 of an inverse loss function in the embodiment.

As a rule followed at the generation of an incorrect answer teacher output value, a rule, in which an element having the accuracy of the second largest value among the elements of the output value 1131 is "1.00", that is, the maximum value, and all other elements are "0.00", can be assumed as illustrated in FIG. 9, for example.

Figure 10:
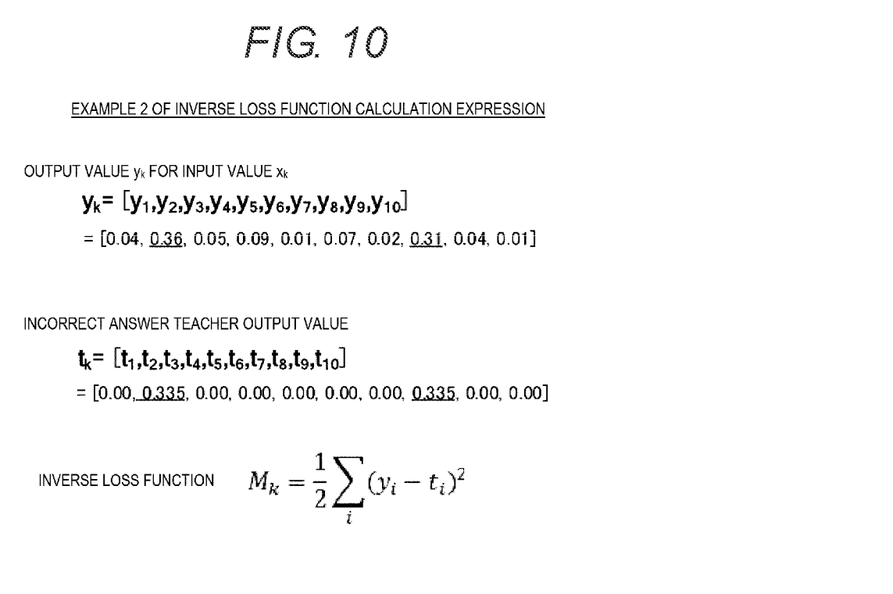
FIG. 10 shows a conceptual calculation example 2 of the inverse loss function in the embodiment.

Alternatively, as illustrated in FIG. 10, it is assumed that the average value of the largest value and the second largest value among the elements of the output value 1131 is calculated, that the maximum value is subtracted by the average value, and that the average value is added to the second largest value. The method of generating the inverse loss function is the same as the method of generating the loss function.

Figure 11:
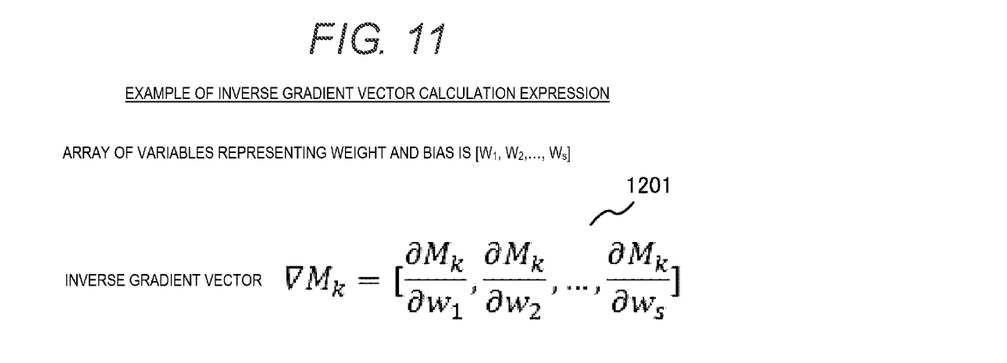
FIG. 11 shows a conceptual calculation example of an inverse gradient vector in the embodiment.

Subsequently, the inverse gradient vector generation unit 118 performs partial differentiation (FIG. 11) of the inverse loss function obtained in s107, generates an inverse gradient vector 1201 (s108), stores the inverse gradient vector 1201 in association with an input value ("random input value" in s101) in the inverse gradient vector storage unit 120, and returns the process to s100. Such a method of generating the inverse gradient vector 1201 is not limited to the case of the gradient vector 1191, and other methods may be adopted as appropriate.

Flow Example 2

Figure 12:
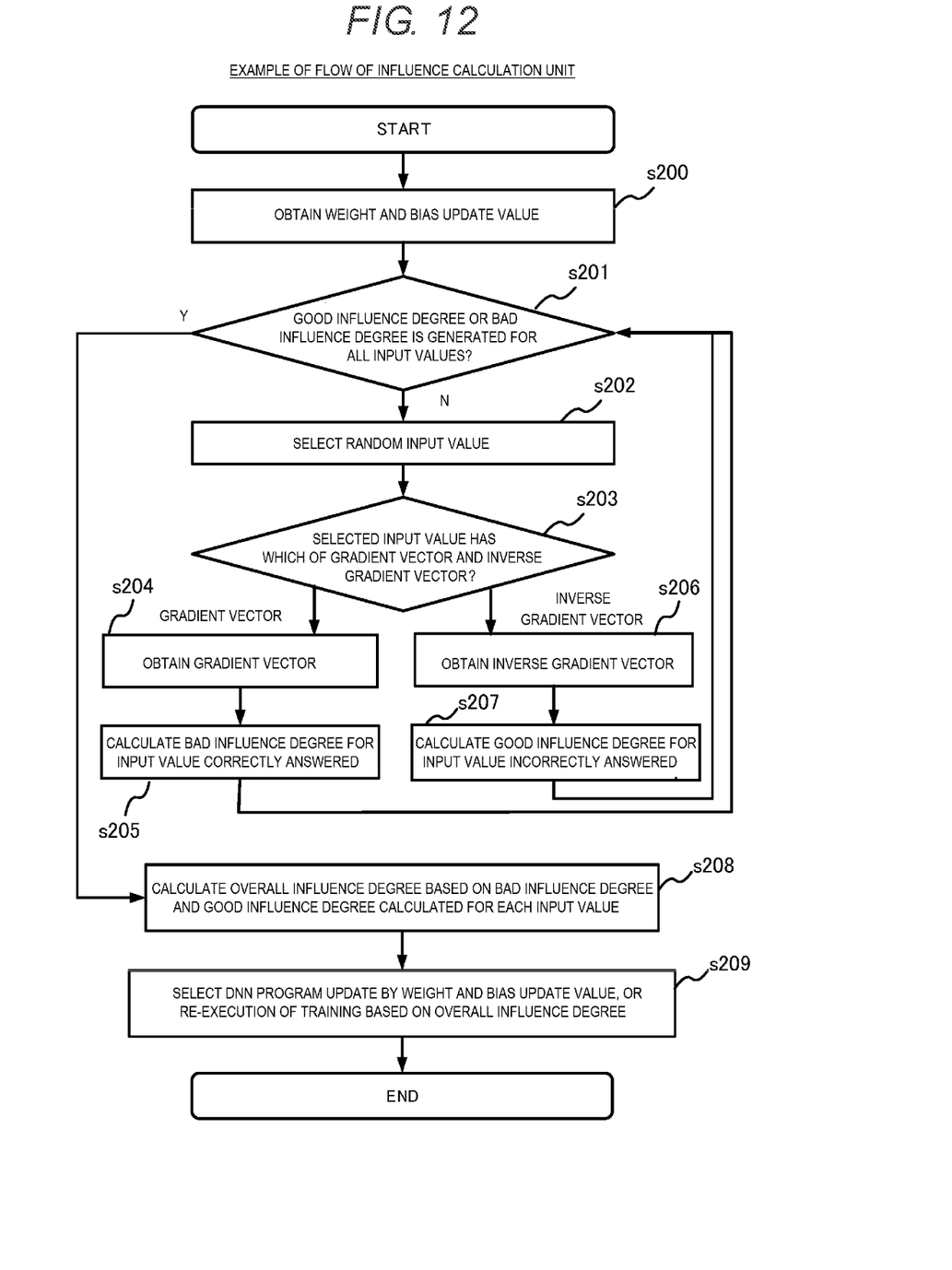
FIG. 12 shows an example 2 of the flow of the learning support method according to the embodiment.
Figure 13:
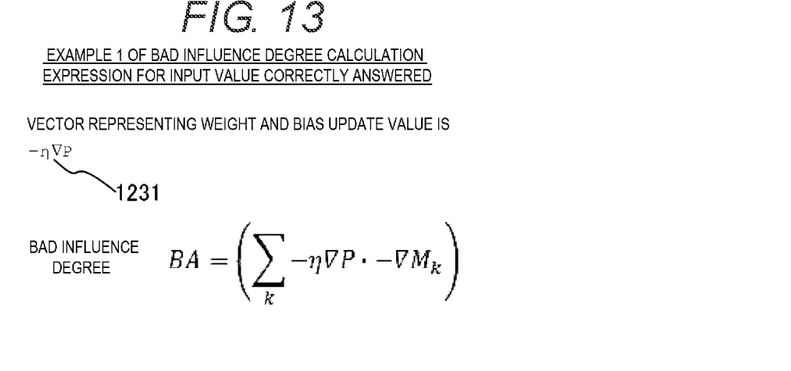
FIG. 13 shows a conceptual calculation example 1 of a bad influence value in the embodiment.

Next, a flow of the influence calculation unit 121 will be described. FIG. 12 shows an example 2 of the flow of the learning support method according to the embodiment.

In this case, first, the influence calculation unit 121 obtains the update value 1231 stored by the weight and bias update value storage unit 123 (s200). As described above, the update value 1231 is $-\eta \cdot \Delta P$ when the learning coefficient is $\eta$ and the gradient vector is $\Delta P$.

Subsequently, the influence calculation unit 121 refers to the input value storage unit 110 and the influence value storage unit 122 for each input value, and determines whether the good influence degree and the bad influence degree have been generated for all input values (s201).

When the result of the determination indicates that the good influence degree and the bad influence degree have already been generated for all the input values (s201: Y), the influence calculation unit 121 shifts the process to s208.

On the other hand, when the result of the determination indicates that the good influence degree and the bad influence degree have not been generated for all the input values (s201: N), the influence calculation unit 121 selects, for example, a user-designated or random input value (neither of which has generated the good influence degree or the bad influence degree) (s202), and determines whether the input value has any of the gradient vector 1191 and the inverse gradient vector 1201 (s203).

In this case, the influence calculation unit 121 retrieves the gradient vector 1191 in the gradient vector storage unit 119 and the inverse gradient vector 1201 in the inverse gradient vector storage unit 120 for the input value.

The influence calculation unit 121 assigns a processed flag to the input value in the input value storage unit 110 each time the process of this flow is executed for the input value. Therefore, the influence calculation unit 121 performs the determination of s201 and the selection of the unprocessed input values in s202 based on the presence or absence of the flag.

Next, when the result of the determination in s203 indicates that the gradient vector 1191 can be specified for the input value (s203: gradient vector), the influence calculation unit 121 obtains the gradient vector 1191 from the gradient vector storage unit 119 (s204).

The influence calculation unit 121 calculates the bad influence degree for the input value (s205), stores the result in the influence value storage unit 122 for each input value, and shifts the process to s201.

Examples of calculation of the bad influence degree are shown in FIGS. 13 to 16. For example, in the example of calculation shown in FIG. 13, the inner product between the weight and bias update value 1231, that is, $-\eta \cdot \Delta P$, and the inverse gradient vector 1201 ("$-\Delta M_k$" as shown) is aggregated for each input value (for each k).

Figure 14:
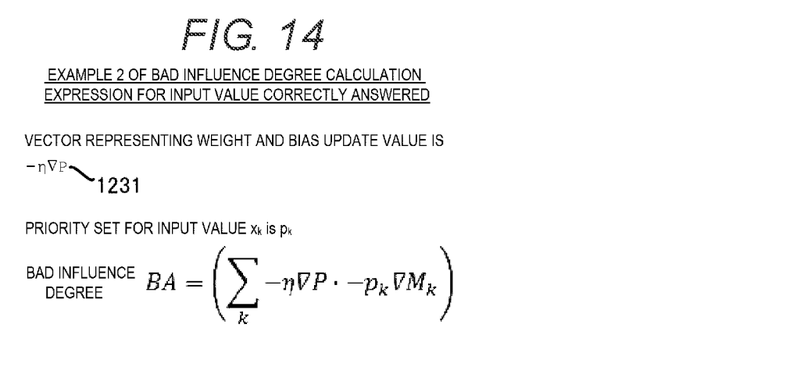
FIG. 14 shows a conceptual calculation example 2 of the bad influence value in the embodiment.

In the example of calculation shown in FIG. 14, the inner product between the weight and bias update value 1231, that is, $-\eta \cdot \Delta P$, and the inverse gradient vector 1201 ("$-\Delta M_k$" as shown) multiplied by priority $p_k$ is aggregated for each input value (for each k). The priority $p_k$ is a weight value that is set in advance according to importance of the input value.

Figure 15:
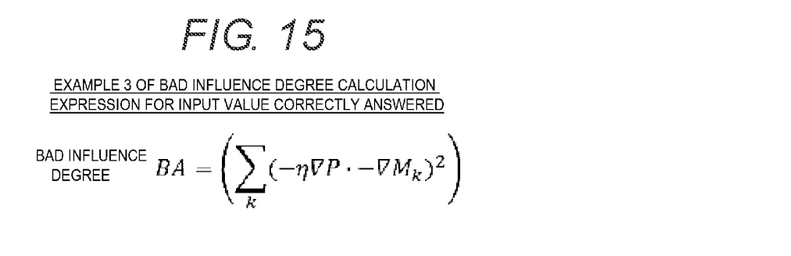
FIG. 15 shows a conceptual calculation example 3 of the bad influence value in the embodiment.

In the example of calculation shown in FIG. 15, the product, which is obtained by squaring the inner product between the weight and bias update value 1231, that is, $-\eta \cdot \Delta P$, and the inverse gradient vector 1201 ("$-\Delta M_k$" as shown), is aggregated for each input value (for each k).

Figure 16:
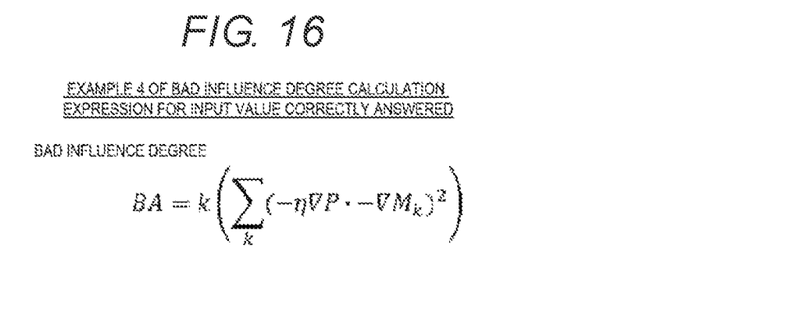
FIG. 16 shows a conceptual calculation example 4 of the bad influence value in the embodiment.

In the example of calculation shown in FIG. 16, the product, which is obtained by squaring the inner product between the weight and bias update value 1231, that is, $-\eta \cdot \Delta P$, and the inverse gradient vector 1201 ("$-\Delta M_k$" as shown), is aggregated for each input value (for each k), and the product is multiplied by the number of input values to be generated by the inverse loss function.

On the other hand, when the result of the determination in s203 indicates that the inverse gradient vector 1201 can be specified for the input value (s203: inverse gradient vector), the influence calculation unit 121 obtains the inverse gradient vector 1201 from the inverse gradient vector storage unit 120 (s206).

The influence calculation unit 121 calculates the good influence degree for the input value (s207), stores the result in the influence value storage unit 122 for each input value, and shifts the process to s201.

Figure 17:
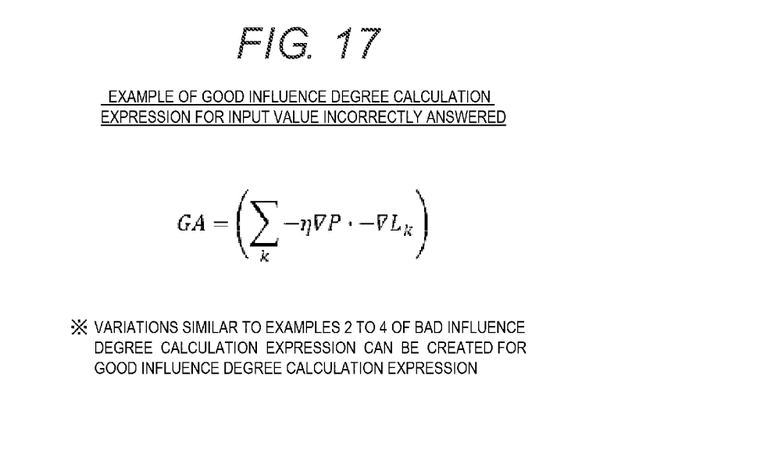
FIG. 17 shows a conceptual calculation example of a good influence value in the embodiment.

As illustrated in FIG. 17, the good influence degree is calculated by aggregating the inner product between the weight and bias update value 1231, that is, $-\eta \cdot \Delta P$, and the gradient vector 1191 ("$-\Delta L_k$" as shown) for each input value (for each k). A variation similar to the examples of calculation of the bad influence degree (FIGS. 13 to 16) may be adopted as appropriate for the calculation of the good influence value.

Now, the flow of FIG. 12 will be described. When the result of the determination in s201 indicates that the good influence degree and the bad influence degree have already been generated for all the input values (s201: Y), the influence calculation unit 121 reads the values of the good influence degree and the bad influence degree calculated for each input value, from the influence value storage unit 122 for each input value, and calculates an overall influence degree based on the values of the good influence degree and the bad influence degree calculated for each input value (s208).

Figure 18:
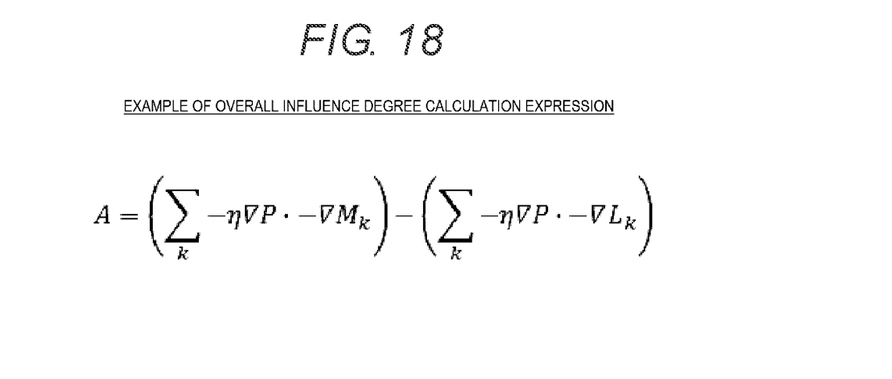
FIG. 18 shows a conceptual calculation example of an overall influence value in the embodiment.
Figure 19:
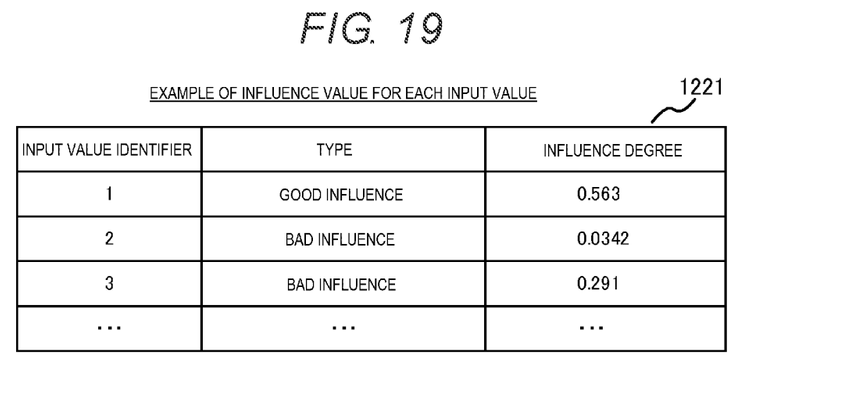
FIG. 19 shows an example of an influence value for each input value in the embodiment.

An example of the overall influence degree calculation method is shown in FIG. 18. As shown here, the influence calculation unit 121 subtracts the good influence degree from the bad influence degree obtained for each input value to calculate the overall influence degree.

Subsequently, the influence calculation unit 121 determines whether the update (parameter update by the update value 1231, that is, η·ΔP) is adopted based on whether or not the overall influence degree obtained in s208 is equal to or less than a predetermined threshold, that is, whether or not a bad influence element is equal to or less than a predetermined reference (s209).

When the result of the determination indicates that the update (parameter update by the update value 1231, that is, η·ΔP) can be adopted, the influence calculation unit 121 notifies the DNN program update unit 124 of this fact and ends the process. In this case, the DNN program update unit 124 receives the notification that the update can be adopted from the influence calculation unit 121, and obtains the update value 1231 from the weight and bias update value storage unit 123, thereby updating the DNN program 1121 in the DNN program storage unit 112.

On the other hand, when the result of the determination indicates that the update (parameter update by the update value 1231, that is, η·ΔP) cannot be adopted, the influence calculation unit 121 instructs the DNN program training unit 117 to retrain the DNN program 1121, and then ends the flow.

It is preferable that the influence calculation unit 121 lowers the threshold used for the determination of the adoption by a predetermined degree in accordance with a predetermined rule, after the update (by the DNN program update unit 124) of the DNN program 1121 by the update value adopted by the determination of the adoption.

Flow Example 3

Figure 20:
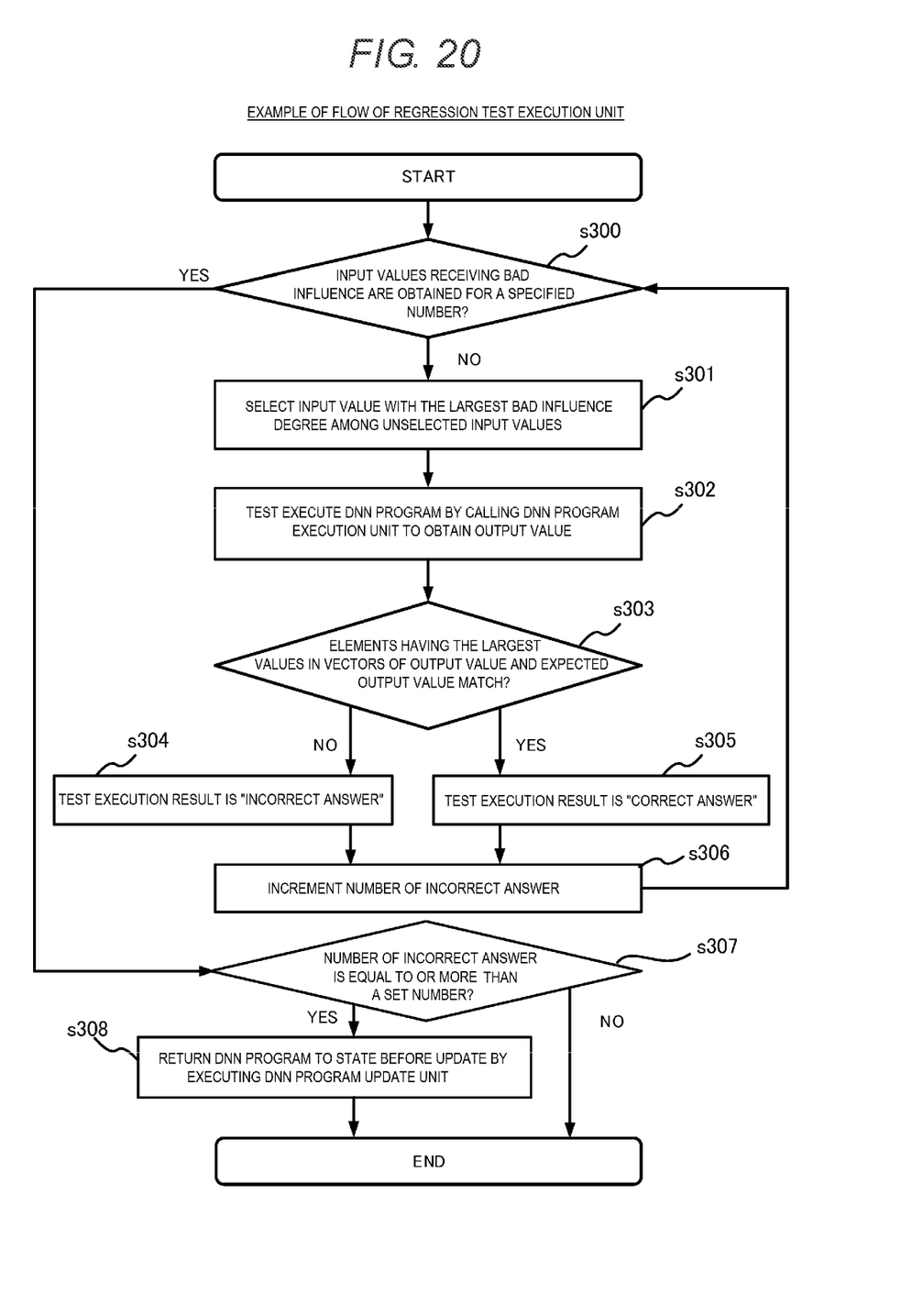
FIG. 20 shows an example 3 of the flow of the learning support method according to the embodiment.

Next, a flow of the regression test execution unit 125 will be described. FIG. 20 shows an example 3 of the flow of the learning support method according to the embodiment. This flow is assumed to be started after the adoption of the update value is determined by the influence calculation unit 121 and the update of the DNN program 1121 by the update value is executed.

In this case, the regression test execution unit 125 refers to the influence value storage unit 122 for each input value, and determines whether or not one or more unprocessed input values, for example, with the bad influence value being relatively larger than the good influence value, among the input values, can be obtained in this flow (s300).

When the result of the determination indicates that the input value whose type falls into "bad influence" (that is, the bad influence degree is relatively larger than the good influence degree) among the input values can be obtained in this flow at a predetermined number or more, that is, the input values have been processed (s300: Y), the regression test execution unit 125 shifts the process to s307.

The regression test execution unit 125 assigns a processed flag to the input value in the influence value storage unit 122 for each input value each time the process of this flow is executed for the input value. Therefore, the regression test execution unit 125 determines whether the number of flags is a predetermined number at a time of determination in s300.

On the other hand, the result of the determination is as follows. When the input value whose type falls into "bad influence" among the input values cannot be obtained at the predetermined number or more in this flow (s300: N), the regression test execution unit 125 selects the input value with the largest bad influence degree among the input values that have not been selected, that is, have not been assigned the flags, in the influence value storage unit 122 for each input value (s301).

Subsequently, the regression test execution unit 125 calls the DNN program execution unit 111, gives the input value selected in s301 to execute the DNN program 1121, and obtains an output value thereof (s302).

For the result of executing the regression test, the regression test execution unit 125 determines whether or not the elements having the largest values between the output value and the expected output value for the input value match according to the test result (s303).

When the result of the determination indicates that the elements having the largest values between the output value and the expected output value for the input value do not match according to the test result (s303: N), the regression test execution unit 125 determines that the execution result of the regression test is "incorrect answer" (s304), and increments the value of the number of incorrect answers counted in the memory 103 (s306).

On the other hand, when the result of the determination indicates that the elements having the largest values between the output value and the expected output value for the input value match according to the test result (s303: Y), the regression test execution unit 125 determines that the execution result of the regression test is "correct answer" (s305), and shifts the process to s300.

When the series of processes of s300 to s306 are repeated and the determination in s300 indicates that the input value whose type falls into "bad influence" (that is, the input value with the bad influence degree being relatively larger than the good influence degree) among the input values can be obtained at a predetermined number or more in this flow, that is, the input values have been processed (s300: Y), the regression test execution unit 125 determines that the value of the number of incorrect answers stored in the memory 103 exceeds a predetermined reference (s307).

When the result of the determination indicates that the number of the incorrect answers does not exceed the reference (s307: N), the regression test execution unit 125 ends the process.

On the other hand, when the result of the determination indicates that the number of the incorrect answers exceeds the reference (s307: Y), the regression test execution unit 125 instructs the DNN program update unit 124 to roll back the update, returns the DNN program 1121 to a state before the update (s308), and ends the process.

The learning support device and the learning support method described above can be applied to an image recognition technology in an automatic driving system of a vehicle or the like. The image recognition technology in the automatic driving system, for example, specifies the type of a traffic sign based on image data (obtained via a camera mounted on a vehicle or the like) of the traffic sign on a road, and notifies the automatic driving system of what the type of traffic sign indicates.

Therefore, when the learning support device and the learning support method according to the embodiment are applied to the image recognition of the automatic driving system, the accuracy of specifying traffic signs is continuously maintained and improved.

In addition to the methods described in the embodiment, a method of multiplexing and operating a model can also be assumed. For example, there is an operation in which the updated model is executed as a sub system for a while to check whether or not the updated model is changed for the worse, and the main system is switched only when the updated model is not changed for the worse. However, even if this method is adopted, there remains a problem that model update that is an original purpose cannot be performed rapidly.

Although the preferred modes and the like for carrying out the invention have been specifically described above, the invention is not limited thereto and various modifications can be made without departing from the gist thereof.

According to the embodiment, a probability of a model generated by machine learning being changed for the worse can be reduced and rapid model update can be realized at a time of updating the model.

According to the description of this specification, at least the following is clarified. That is, in the learning support device according to the embodiment, the arithmetic device may calculate the influence degree by calculating an inner product between the vector of the update value of the parameter and the vector of the change value of the parameter at the time of calculating the influence degree.

Accordingly, the influence degree that is the vector can be specified with accuracy. As a result, the probability of a model generated by machine learning being changed for the worse can be further reduced and rapid model update can be realized at the time of updating the model.

In the learning support device according to the embodiment, the arithmetic device may calculate the influence degree by multiplying the inner product of the update value of the corresponding parameter by a predetermined weight value according to the importance of the execution information at the time of calculating the influence degree.

Accordingly, it is possible to improve the influence sensitivity of the bad influence with respect to the execution information that is particularly desired to avoid a bad influence, and thus it is possible to further reduce the probability of the model generated by machine learning being changed for the worse and to update the model rapidly at the time of updating the model.

In the learning support device according to the embodiment, the arithmetic device may, at the time of generating the loss function, generate the expected output value as a correct answer teacher output value and generate a loss function based on the difference between the correct answer teacher output value and the execution output value, when the execution output value and the expected output value for the predetermined input value do not match with each other, and meanwhile generate the teacher output value as an incorrect answer teacher output value and generate an inverse loss function based on the difference between the incorrect answer teacher output value and the execution output value, when the execution output value and the expected output value for a predetermined input value match with each other; at the time of generating the change value, generate a change value indicating changes of the inverse loss function and the loss function; and at the time of calculating the influence degree, take a value, which is obtained by subtracting a calculated value of an inner product between an update value vector of the parameter and a change value vector of the loss function of the parameter from a calculated value of an inner product between the update value vector of the parameter and a change value vector of the inverse loss function of the parameter, as the influence degree.

Accordingly, it is possible to consider the bad influence and the good influence of update together, and thus it is possible to further reduce the probability of the model generated by machine learning being changed for the worse and to update the model rapidly at the time of updating the model.

In the learning support device according to the embodiment, the arithmetic device may, at the time of calculating the influence degree, perform exponentiation operations on the calculated value of the inner product between the update value vector of the parameter and the change value vector of the inverse loss function of the parameter, and on the calculated value of the inner product between the update value vector of the parameter and the change value vector of the loss function of the parameter, and then perform the subtraction to calculate the influence degree.

Accordingly, it is possible to improve the influence sensitivity for the bad influence and the good influence, and thus it is possible to further reduce the probability of the model generated by machine learning being changed for the worse and to update the model rapidly at the time of updating the model.

In the learning support device according to the embodiment, the arithmetic device may, at the time of calculating the influence degree, subtract a value, which is obtained by multiplying the calculated value of inner product between the update value vector of the parameter and the change value vector of the loss function of the parameter by the number of pieces of execution information to be generated by the loss function, from a value, which is obtained by multiplying the calculated value of inner product between the update value vector of the parameter and the change value vector of the inverse loss function of the parameter by the number of pieces of execution information to be generated by the inverse loss function, to calculate the influence degree.

Accordingly, it is possible to accurately improve the influence sensitivity for the bad influence and the good influence, and thus it is possible to further reduce the probability of the model generated by machine learning being changed for the worse and to update the model rapidly at the time of updating the model.

In the learning support device according to the embodiment, the arithmetic device may determine to adopt the update value when the influence degree is equal to or less than a predetermined threshold, and lower the threshold by a predetermined degree after updating the machine learning program by the update value determined to adopt.

Accordingly, as the accuracy of the machine learning model improves, the content of the update becomes minor, that is, the influence of the update value becomes small, and it becomes possible to cope with the case that the adoption of the update value should be strictly performed. As a result, the probability of a model generated by machine learning being changed for the worse can be further reduced and rapid model update can be realized at the time of updating the model.

In the learning support device according to the embodiment, the arithmetic device may determine to adopt the update value; at the time of executing a regression test for the machine learning program after updating the machine learning program by the update value determined to be adopted, sequentially select the input values with a large influence degree obtained by calculating the inner product between the update value vector of the parameter and the change value vector of the parameter as the input values, to execute the regression test; and count the number of cases where the result of the test indicates that the execution output value and the expected output value for an input value do not match with each other, that is, an incorrect answer is presented, and roll back the update when the result of the test indicates that the counted value exceeds a predetermined reference.

Accordingly, it is possible to cope with a situation where accuracy improvement of the machine learning program by the update is not observed and instead the update is performed leading to deteriorate the accuracy. As a result, the probability of a model generated by machine learning being changed for the worse can be further reduced and rapid model update can be realized at the time of updating the model.

Although the present disclosure has been described with reference to example embodiments, those skilled in the art will recognize that various changes and modifications may be made in form and detail without departing from the spirit and scope of the claimed subject matter.

What is claimed is:

1. A learning support device, comprising:
a memory that stores, as execution information, a set of an input value, an execution output value as an execution result for the input value and an expected output value that is an output value expected for the input value, for a machine learning program that is executed according to an algorithm of a neural network; and
a processor coupled to the memory,
wherein the processor is programmed to:
generate an output value different from the expected output value as a teacher output value in accordance with a predetermined rule when the execution output value and the expected output value for a predetermined input value match with each other,
generate a loss function based on a difference between the teacher output value and the execution output value,
generate a change value indicating a change in the loss function for each parameter in the neural network,
calculate an influence degree of predetermined learning by calculating influence of an update value for each parameter obtained by the learning on the change value,
determine whether the update value is adopted based on the influence degree,
calculate the influence degree by calculating an inner product between a vector of the update value of the parameter and a vector of the change value of the parameter at a time of calculating the influence degree,
at a time of generating the loss function, generate the expected output value as a correct answer teacher output value and generate a loss function based on a difference between the correct answer teacher output value and the execution output value, when the execution output value and the expected output value for the predetermined input value do not match with each other, and generate the teacher output value as an incorrect answer teacher output value and generate an inverse loss function based on a difference between the incorrect answer teacher output value and the execution output value, when the execution output value and the expected output value for a predetermined input value match with each other,
at a time of generating the change value, generate a change value indicating a change of the inverse loss function and the loss function,
at a time of calculating the influence degree, take a value, which is obtained by subtracting a calculated value of an inner product between a vector of the update value of the parameter and a vector of the change value of the loss function of the parameter from a calculated value of an inner product between the vector of the update value of the parameter and the vector of the change value of the inverse loss function of the parameter, as the influence degree, and
determine to adopt the update value and update the machine learning program by the update value determined to be adopted.

2. The learning support device according to claim 1, wherein
the processor is programmed to calculate the influence degree by multiplying the inner product for an update value of a corresponding parameter by a predetermined weight value according to importance of the execution information at the time of calculating the influence degree.

3. The learning support device according to claim 1, wherein the is programmed to:
at the time of calculating the influence degree, perform exponentiation operations on the calculated value of the inner product between the vector of the update value of the parameter and the vector of the change value of the inverse loss function of the parameter, and on the calculated value of the inner product between the vector of the update value of the parameter and the vector of the change value of the loss function of the parameter, and then perform the subtraction to calculate the influence degree.

4. The learning support device according to claim 1, wherein the processor is programmed to:
at the time of calculating the influence degree, subtract a value, which is obtained by multiplying the calculated value of inner product between the vector of the update value of the parameter and the vector of the change value of the loss function of the parameter by the number of pieces of execution information to be generated by the loss function, from a value, which is obtained by multiplying the calculated value of inner product between the vector of the update value of the parameter and the vector of the change value of the inverse loss function of the parameter by the number of pieces of execution information to be generated by the inverse loss function, to calculate the influence degree.

5. The learning support device according to claim 1,
wherein the processor is programmed to determine to adopt the update value when the influence degree is equal to or less than a predetermined threshold, and lower the threshold by a predetermined degree after updating the machine learning program by the update value determined to be adopted.

6. The learning support device according to claim 1,
wherein the processor is programmed to:
at a time of executing a regression test for the machine learning program after updating the machine learning program by the update value determined to be adopted, sequentially select input values in descending order of a large influence degree obtained by calculating an inner product between a vector of an update value of the parameter and a vector of a change value of the parameter as input values, to execute the regression test, count a number of cases where a result of the test indicates an incorrect answer in that the execution output value and the expected output value for the input value do not match with each other, and roll back the update when the result of the test indicates that the counted value exceeds a predetermined reference.

7. A learning support device comprising:

a computer including a memory that stores, as execution information, a set of an input value, an execution output value as an execution result for the input value and an expected output value that is an output value expected for the input value, for a machine learning program that is executed according to an algorithm of a neural network, wherein the computer is programmed to:

generate an output value different from the expected output value as a teacher output value in accordance with a predetermined rule when the execution output value and the expected output value for a predetermined input value match with each other, generate a loss function based on a difference between the teacher output value and the execution output value, generate a change value indicating a change in the loss function for each parameter in the neural network, calculate an influence degree of predetermined learning by calculating influence of an update value for each parameter obtained by the learning on the change value, determine whether the update value is adopted based on the influence degree, calculate the influence degree by calculating an inner product between a vector of the update value of the parameter and a vector of the change value of the parameter at a time of calculating the influence degree, at a time of generating the loss function, generate the expected output value as a correct answer teacher output value and generate a loss function based on a difference between the correct answer teacher output value and the execution output value, when the execution output value and the expected output value for the predetermined input value do not match with each other, and generate the teacher output value as an incorrect answer teacher output value and generate an inverse loss function based on a difference between the incorrect answer teacher output value and the execution output value, when the execution output value and the expected output value for a predetermined input value match with each other, at a time of generating the change value, generate a change value indicating a change of the inverse loss function and the loss function, at a time of calculating the influence degree, take a value, which is obtained by subtracting a calculated value of an inner product between a vector of the update value of the parameter and a vector of the change value of the loss function of the parameter from a calculated value of an inner product between the vector of the update value of the parameter and the vector of the change value of the inverse loss function of the parameter, as the influence degree, and determine to adopt the update value and update the machine learning program by the update value determined to be adopted.

* * * * *